United States Patent
Hench et al.

(10) Patent No.: US 10,983,227 B2
(45) Date of Patent: Apr. 20, 2021

(54) ON-DEVICE METROLOGY USING TARGET DECOMPOSITION

(71) Applicant: KLA-Tencor Corporation, Milpitas, CA (US)

(72) Inventors: John Hench, Los Gatos, CA (US); Antonio Arion Gellineau, Santa Clara, CA (US); Alexander Kuznetsov, Austin, TX (US)

(73) Assignee: KLA-Tencor Corporation, Milpitas, CA (US)

( * ) Notice: Subject to any disclaimer, the term of this patent is extended or adjusted under 35 U.S.C. 154(b) by 408 days.

(21) Appl. No.: 16/101,521

(22) Filed: Aug. 13, 2018

(65) Prior Publication Data

US 2019/0049602 A1 Feb. 14, 2019

Related U.S. Application Data

(60) Provisional application No. 62/544,911, filed on Aug. 14, 2017.

(51) Int. Cl.
*G01T 1/24* (2006.01)
*G01N 21/47* (2006.01)
(Continued)

(52) U.S. Cl.
CPC ........... *G01T 1/24* (2013.01); *G01N 21/47* (2013.01); *G01N 21/9501* (2013.01); *G01N 23/201* (2013.01); *G01N 2021/4735* (2013.01)

(58) Field of Classification Search
CPC .. G01T 1/16; G01T 1/24; G01T 1/249; G01T 1/02; G01N 2021/4735; G01N 21/47;
(Continued)

(56) References Cited

U.S. PATENT DOCUMENTS 5,608,526 A 3/1997 Piwonka-Corle et al.
5,859,424 A 1/1999 Norton et al.
(Continued)

FOREIGN PATENT DOCUMENTS

KR 10-2016-0145819 A 12/2016

OTHER PUBLICATIONS

International Search Report dated Dec. 4, 2018, for PCT Application No. PCT/US2018/046771 filed on Aug. 14, 2018 by KLA-Tencor Corporation, 3 pages.

*Primary Examiner* — John R Lee
(74) *Attorney, Agent, or Firm* — Joseph S. Spano; Spano Law Group

(57) ABSTRACT

Methods and systems for more efficient X-Ray scatterometry measurements of on-device structures are presented herein. X-Ray scatterometry measurements of one or more structures over a measurement area includes a decomposition of the one or more structures into a plurality of sub-structures, a decomposition of the measurement area into a plurality of sub-areas, or both. The decomposed structures, measurement areas, or both, are independently simulated. The scattering contributions of each of the independently simulated decomposed structures are combined to simulate the actual scattering of the measured structures within the measurement area. In a further aspect, measured intensities and modelled intensities including one or more incidental structures are employed to perform measurement of structures of interest. In other further aspects, measurement decomposition is employed to train a measurement model and to optimize a measurement recipe for a particular measurement application.

20 Claims, 9 Drawing Sheets

(51) Int. Cl.
*G01N 21/95* (2006.01)
*G01N 23/201* (2018.01)

(58) Field of Classification Search
CPC .............. G01N 21/9501; G01N 21/95; G01N 21/9503; G01N 21/9505; G01N 23/201; G01N 23/203; G01N 23/223; G03F 1/84; G06F 17/40; G06K 9/46; G06T 7/60; G06T 7/00

See application file for complete search history.

(56) References Cited

U.S. PATENT DOCUMENTS

| | | |
|---|---|---|
| 6,023,338 A | 2/2000 | Bareket |
| 6,429,943 B1 | 8/2002 | Opsal et al. |
| 6,716,646 B1 | 4/2004 | Wright et al. |
| 6,778,275 B2 | 8/2004 | Bowes |
| 6,787,773 B1 | 9/2004 | Lee |
| 6,992,764 B1 | 1/2006 | Yang et al. |
| 7,242,477 B2 | 7/2007 | Mieher et al. |
| 7,321,426 B1 | 1/2008 | Poslavsky et al. |
| 7,406,153 B2 | 7/2008 | Berman |
| 7,478,019 B2 | 1/2009 | Zangooie et al. |
| 7,626,702 B2 | 12/2009 | Ausschnitt et al. |
| 7,656,528 B2 | 2/2010 | Abdulhalim et al. |
| 7,826,071 B2 | 11/2010 | Shchegrov et al. |
| 7,842,933 B2 | 11/2010 | Shur et al. |
| 7,873,585 B2 | 1/2011 | Izikson |
| 7,929,667 B1 | 4/2011 | Zhuang et al. |
| 7,933,026 B2 | 4/2011 | Opsal et al. |
| 8,068,662 B2 | 11/2011 | Zhang et al. |
| 8,138,498 B2 | 3/2012 | Ghinovker |
| 9,311,431 B2 | 4/2016 | Yoo et al. |
| 9,778,213 B2 * | 10/2017 | Bakeman .............. G01N 23/223 |
| 9,875,534 B2 * | 1/2018 | Sezginer ................ G06T 7/001 |
| 9,915,522 B1 | 3/2018 | Jiang et al. |
| 9,915,879 B2 * | 3/2018 | Quintanilha ........ G03F 7/70633 |
| 2003/0021465 A1 | 1/2003 | Adel et al. |
| 2007/0221842 A1 | 9/2007 | Morokuma et al. |
| 2009/0152463 A1 | 6/2009 | Toyoda et al. |
| 2011/0266440 A1 | 11/2011 | Boughorbel et al. |
| 2012/0292502 A1 | 11/2012 | Langer et al. |
| 2013/0208279 A1 | 8/2013 | Smith |
| 2013/0304424 A1 | 11/2013 | Bakeman et al. |
| 2014/0019097 A1 | 1/2014 | Bakeman et al. |
| 2014/0111791 A1 | 4/2014 | Manassen et al. |
| 2014/0172394 A1 | 6/2014 | Kuznetsov et al. |
| 2014/0222380 A1 | 8/2014 | Kuznetsov et al. |
| 2014/0297211 A1 | 10/2014 | Pandev et al. |
| 2015/0051877 A1 | 2/2015 | Bakeman et al. |
| 2015/0110249 A1 | 4/2015 | Bakeman et al. |
| 2015/0117610 A1 | 4/2015 | Veldman et al. |
| 2015/0204664 A1 | 7/2015 | Bringoltz et al. |
| 2015/0300965 A1 | 10/2015 | Sezginer et al. |
| 2015/0331336 A1 * | 11/2015 | Quintanilha ........ G03F 7/70683 355/77 |
| 2016/0109230 A1 | 4/2016 | Pandev et al. |
| 2016/0202193 A1 | 7/2016 | Hench et al. |
| 2016/0320319 A1 | 11/2016 | Hench et al. |
| 2017/0061604 A1 | 3/2017 | Pandev |
| 2017/0069080 A1 | 3/2017 | Sezginer et al. |
| 2017/0167862 A1 | 6/2017 | Dziura et al. |
| 2018/0106735 A1 | 4/2018 | Gellineau et al. |
| 2019/0049602 A1 * | 2/2019 | Hench ...................... G01T 1/24 |

\* cited by examiner

ON-DEVICE METROLOGY USING TARGET DECOMPOSITION

CROSS REFERENCE TO RELATED APPLICATION

The present application for patent claims priority under 35 U.S.C. § 119 from U.S. provisional patent application Ser. No. 62/544,911, entitled "Efficient On-Device Metrology Using Target Decomposition," filed Aug. 14, 2017, the subject matter of which is incorporated herein by reference in its entirety.

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures. X-ray scatterometry techniques offer the potential for high throughput without the risk of sample destruction.

Traditionally, optical scatterometry critical dimension (SCR) measurements are performed on targets consisting of thin films and/or repeated periodic structures. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled with available measurements.

In one example, longer wavelengths (e.g. near infrared) have been employed in an attempt to overcome penetration issues for 3D FLASH devices that utilize polysilicon as one of the alternating materials in the stack. However, the mirror like structure of 3D FLASH intrinsically causes decreasing light intensity as the illumination propagates deeper into the film stack. This causes sensitivity loss and correlation issues at depth. In this scenario, optical SCD is only able to successfully extract a reduced set of metrology dimensions with high sensitivity and low correlation.

In another example, opaque, high-k materials are increasingly employed in modern semiconductor structures. Optical radiation is often unable to penetrate layers constructed of these materials. As a result, measurements with thin-film scatterometry tools such as optical ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. However, these approaches have not reliably overcome fundamental challenges associated with measurement of many advanced targets (e.g., complex 3D structures, structures smaller than 10 nm, structures employing opaque materials) and measurement applications (e.g., line edge roughness and line width roughness measurements).

Optical methods may provide non-destructive tracking of process variables between process steps, but regular calibration by destructive methods is required to maintain accuracy in the face of process drift.

Atomic force microscopes (AFM) and scanning-tunneling microscopes (STM) are able to achieve atomic resolution, but they can only probe the surface of the specimen. In addition, AFM and STM microscopes require long scanning times. Scanning electron microscopes (SEM) achieve intermediate resolution levels, but are unable to penetrate structures to sufficient depth. Thus, high-aspect ratio holes are not characterized well. In addition, the required charging of the specimen has an adverse effect on imaging performance.

To overcome penetration depth issues, traditional imaging techniques such as TEM, SEM etc., are employed with destructive sample preparation techniques such as focused ion beam (FIB) machining, ion milling, blanket or selective etching, etc. For example, transmission electron microscopes (TEM) achieve high resolution levels and are able to probe arbitrary depths, but TEM requires destructive sectioning of the specimen. Several iterations of material removal and measurement generally provide the information required to measure the critical metrology parameters throughout a three dimensional structure. But, these techniques require sample destruction and lengthy process times. The complexity and time to complete these types of measurements introduces large inaccuracies due to drift of etching and metrology steps because the measurement results become available long after the process has been completed on the wafer under measurement. Thus, the measurement results are subject to biases from further processing and delayed feedback. In addition, these techniques require numerous iterations which introduce registration errors. In summary, device yield is negatively impacted by long and destructive sample preparation required for SEM and TEM techniques.

It is of particular interest to perform measurements of on-device device structures or device-like structures (e.g., actual functional structures or proxy structures fabricated in the active area of a semiconductor wafer), rather than simplified, throw-away structures fabricated in scribe lines of the semiconductor wafer. Measuring on-device structures eliminates or significantly reduces bias between a measured structure and the actual device structure, thus increasing metrology correlation to yield. On-device metrology reduces the area required for larger, specialized metrology targets, potentially increasing wafer area available for functional devices. However, on-device structures (e.g., those located in the active area of the wafer) cannot be damaged by the measurement process. The structures cannot be simplified or removed for measurement.

Small-Angle X-Ray Scatterometry (SAXS) systems have shown promise to address challenging measurement applications. SAXS systems are capable of non-destructive, high resolution measurements over a relatively large measurement area. However, on-device structures are significantly more complex than simplified metrology structures, and this complexity presents significant modeling challenges for SAXS measurements.

It is typical to measure and model the largest common unit cell of the structure under measurement. Using this approach, the entire extent of the periodicity is modeled to compute X-Ray scattering. For complicated periodic geometric models, a large number of shapes that characterize the structure are described mathematically. For current memory applications, the largest common unit cell may have dimensions on the order of tens of micrometers, while the required measurement resolution is on the order of an Angstrom. Thus, in practice, modeling the largest common unit cell is extremely complex, computationally expensive, and prone to error. A large, complicated model employed to compute X-Ray scattering is computationally expensive because the large periodicity requires the computation of many scattered orders from many geometric features to accurately estimate actual scattering.

In summary, ongoing reductions in feature size and increased depth of many semiconductor structures impose difficult requirements on metrology systems. Although SAXS measurement systems have shown promise to address challenging measurement applications, measurement model complexity limits the measurement of parameters of interest of complex, periodic structures in a cost effective and timely manner. Thus, improved SAXS metrology systems and methods are desired to measure high aspect ratio structures to maintain high device yield.

SUMMARY

Methods and systems for more efficient X-Ray scatterometry measurements of on-device structures are presented herein. On-device structures or device-like scatterometry targets are necessarily complex to avoid bias between measurements and actual device structures. Moreover, the area of a semiconductor wafer measured by a metrology system at a given instance or measurement interval may include one or more on-device structures or device-like scatterometry targets. X-Ray scatterometry measurements of on-device or device-like scatterometry targets are described more simply as a decomposed set of sub-structures, measurement sub-areas, or both.

In one aspect, an X-Ray scatterometry measurement of one or more structures over a measurement area includes a decomposition of the one or more structures into a plurality of sub-structures, a decomposition of the measurement area into a plurality of sub-areas, or both. The decomposed structures, measurement areas, or both, are independently simulated.

In some embodiments, a complicated periodic structure under measurement is modelled as a summation of simple, periodic sub-structures.

In some embodiments, a complicated periodic structure under measurement is modelled as a summation of different periodic shapes of the same periodicity.

In some embodiments, a complicated periodic structure under measurement is modelled as a summation of different periodic shapes having different periodicities.

In some embodiments, a complicated structure under measurement is modelled as a summation of a relatively simple shape repeated multiple times in a nearly periodic manner.

In some examples, a complicated structure under measurement is modelled as a simple structure with a small period and another structural perturbation with a large period that is an integer multiple of the small period.

In some embodiments, the measurement area is subdivided into a number of different sub-areas each associated with a different structure or combination of sub-structures.

In another aspect, the scattering response associated with each decomposed measurement element is independently simulated.

In yet another aspect, the scattering contributions of each of the independently simulated decomposed structures are combined to simulate the actual scattering of the measured structures within the measurement area. The scattered fields associated with any combination of decomposed measurement structures are combined differently depending on whether the illumination of the underlying structure(s) is coherent, incoherent, or some combination of coherent and incoherent.

In a further aspect, measured intensities and modelled intensities including one or more incidental structures are employed to perform measurement of structures of interest. In some examples, on-device measurements are decomposed into a critical target for metrology and a complex, incidental, under-layer structure.

In some examples, measurements are collected from a critical structure including contamination with measurement signals from an incidental structure. In addition, measurements are collected from a simple structure fabricated over the same incidental under-layer. Measurement decomposition as described herein is employed to directly subtract the measurement data associated with the critical structure from the measurement data associated with the simple structure to effectively cancel the measurement signals associated with the incidental under-layer.

In another further aspect, an incidental model operates directly on scattered data measured at the detector and effectively filters the measured data to remove the influence of incidental structures on the measured data. In some examples, the incidental model is a heuristic model employed to describe observed phenomena in the measured data that are known to be associated with incidental structures. After filtering the measured data, the resulting filtered measurement data is employed as part of a model based measurement of parameters of interest as described herein.

In another further aspect, measurement decomposition is employed to train an input-output measurement model that establishes a functional relationship between measured scattered intensities and values of one or more parameters of interest.

In another further aspect, measurement decomposition is employed to optimize a measurement recipe for a particular measurement application. An optimized measurement recipe includes a selection of physical parameters of the measurement system that enhances signals of interest and suppresses signals from incidental structures.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for more efficient X-Ray scatterometry measurements of on-device structures are presented herein. On-device structures or device-like scatterometry targets are necessarily complex to avoid bias between measurements and actual device structures. Moreover, the area of a semiconductor wafer measured by a metrology system at a given instance or measurement interval may include one or more on-device structures or device-like scatterometry targets. However, X-Ray scatterometry measurements of on-device or device-like scatterometry targets are described more simply as a decomposed set of sub-structures, measurement sub-areas, or both.

Figure 1:
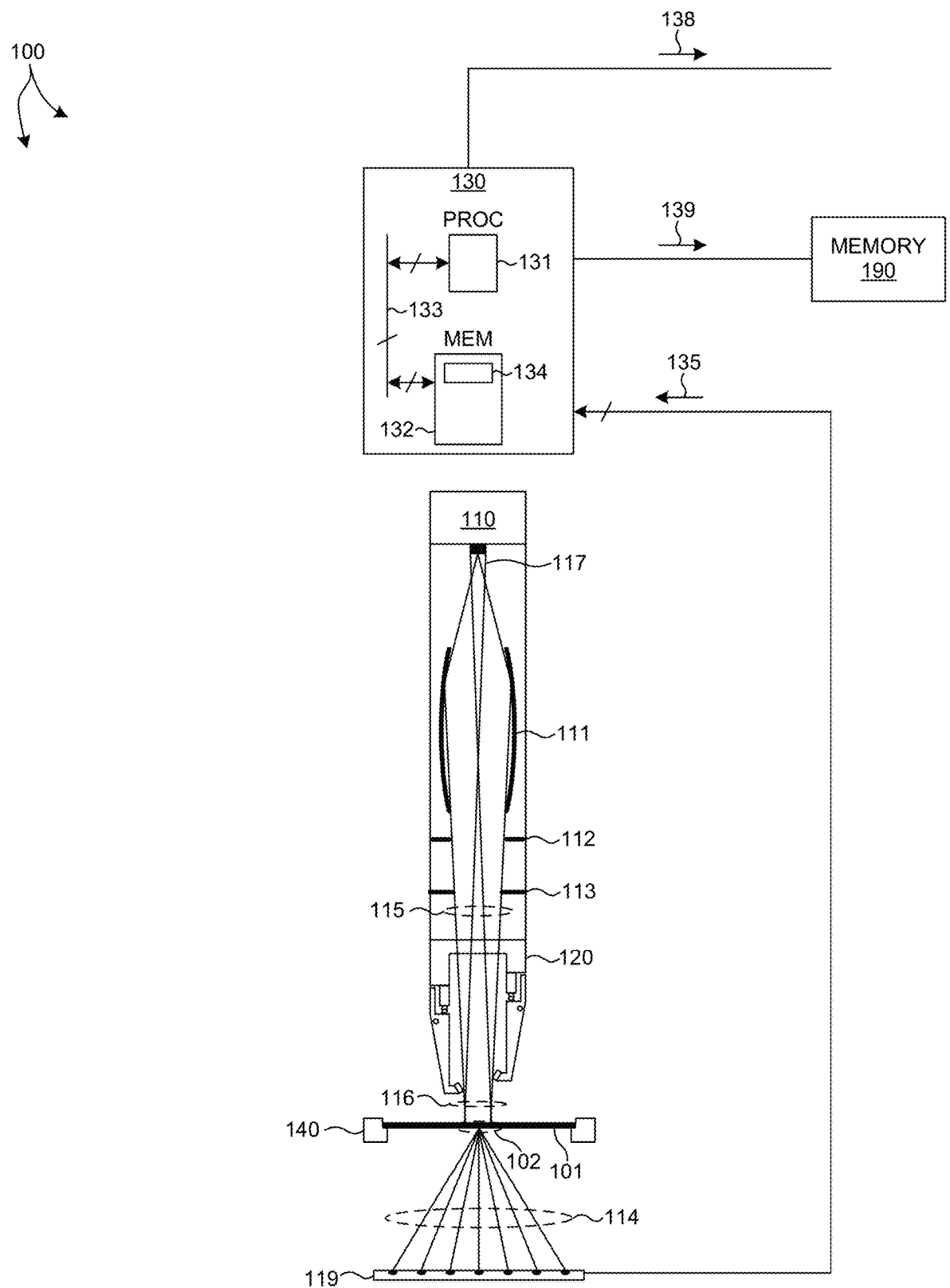
FIG. 1 is a diagram illustrative of a metrology system 100 configured to perform measurement decomposition in accordance with the methods described herein.

FIG. 1 illustrates an embodiment of a transmission, small-angle x-ray scatterometry (T-SAXS) metrology tool 100 for measuring characteristics of a specimen in accordance with the exemplary methods presented herein. As shown in FIG. 1, the system 100 may be used to perform T-SAXS measurements over a measurement area 102 of a specimen 101 illuminated by an illumination beam spot.

In the depicted embodiment, metrology tool 100 includes an x-ray illumination source 110 configured to generate x-ray radiation suitable for T-SAXS measurements. In some embodiments, the x-ray illumination source 110 is configured to generate wavelengths between 0.01 nanometers and 1 nanometer. In general, any suitable high-brightness x-ray illumination source capable of generating high brightness x-rays at flux levels sufficient to enable high-throughput, inline metrology may be contemplated to supply x-ray illumination for T-SAXS measurements. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, a plasma based source, and an inverse Compton source may be employed as x-ray illumination source 110. In one example, an inverse Compton source available from Lyncean Technologies, Inc., Palo Alto, Calif. (USA) may be contemplated. Inverse Compton sources have an additional advantage of being able to produce x-rays over a range of photon energies, thereby enabling the x-ray source to deliver x-ray radiation at different, selectable wavelengths.

Exemplary x-ray sources include electron beam sources configured to bombard solid or liquid targets to stimulate x-ray radiation. Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

X-ray illumination source 110 produces x-ray emission over a source area having finite lateral dimensions (i.e., non-zero dimensions orthogonal to the beam axis). Focusing optics 111 focuses source radiation onto a metrology target located on specimen 101. The finite lateral source dimension results in finite spot size 102 on the target defined by the rays 117 coming from the edges of the source. In some embodiments, focusing optics 111 includes elliptically shaped focusing optical elements.

A beam divergence control slit 112 is located in the beam path between focusing optics 111 and beam shaping slit mechanism 120. Beam divergence control slit 112 limits the divergence of the illumination provided to the specimen under measurement. An additional intermediate slit 113 is located in the beam path between beam divergence control slit 112 and beam shaping slit mechanism 120. Intermediate slit 113 provides additional beam shaping. In general, however, intermediate slit 113 is optional.

Beam shaping slit mechanism 120 is located in the beam path immediately before specimen 101. In one aspect, the slits of beam shaping slit mechanism 120 are located in close proximity to specimen 101 to minimize the enlargement of the incident beam spot size due to beam divergence defined by finite source size. In one example, expansion of the beam spot size due to shadow created by finite source size is approximately one micrometer for a 10 micrometer x-ray source size and a distance of 25 millimeters between the beam shaping slits and specimen 101.

In some embodiments, beam shaping slit mechanism 120 includes multiple, independently actuated beam shaping slits (i.e., blades). In one embodiment, beam shaping slit mechanism 120 includes four independently actuated beam shaping slits. These four beams shaping slits effectively block a portion of incoming beam 115 and generate an illumination beam 116 having a box shaped illumination cross-section.

Figure 2:
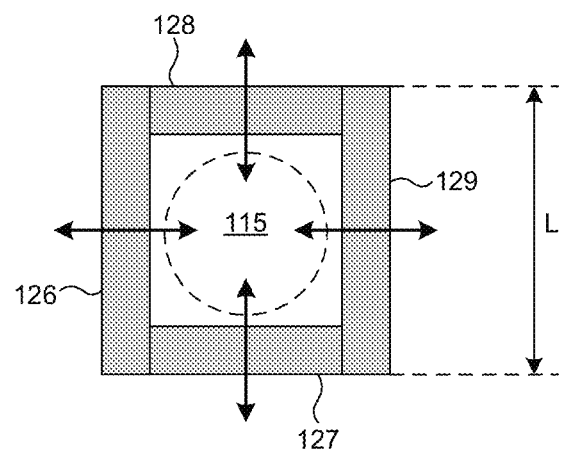
FIG. 2 depicts an end view of beam shaping slit mechanism 120 in one configuration.
Figure 3:
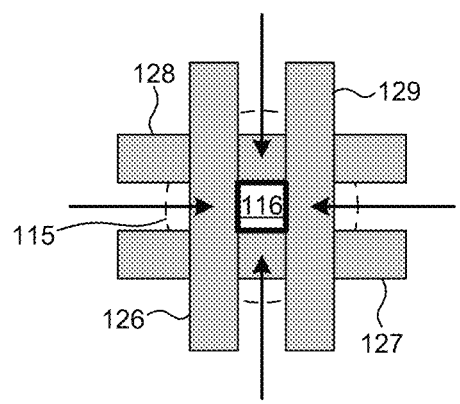
FIG. 3 depicts an end view of beam shaping slit mechanism 120 in another configuration.

FIGS. 2 and 3 depict an end view of beam shaping slit mechanism 120 depicted in FIG. 1 in two different configurations. As illustrated in FIGS. 2 and 3, the beam axis is perpendicular to the drawing page. As depicted in FIG. 2, incoming beam 115 has a large cross-section. In some embodiments, incoming beam 115 has a diameter of approximately one millimeter. Furthermore, the location of incoming beam 115 within beam shaping slits 126-129 may have an uncertainty of approximately three millimeters due to beam pointing errors. To accommodate the size of the incoming beam and the uncertainty of the beam location, each slit has a length, L, of approximately six millimeters. As depicted in FIG. 2, each slit is moveable in a direction perpendicular to the beam axis. In the illustration of FIG. 2, slits 126-129 are located at a maximum distance from the beam axis i.e., the slits are fully open and they are not restricting the light passing through beam shaping slit mechanism 120.

FIG. 3 depicts slits 126-129 of beam shaping slit mechanism 120 in positions that block a portion of incoming beam 115, such that outgoing beam 116 delivered to the specimen under measurement has reduced size and well-defined shape. As depicted in FIG. 3, each of slits 126-129 has moved inward, toward the beam axis to achieve the desired output beam shape.

Slits 126-129 are constructed from materials that minimize scattering and effectively block incident radiation. Exemplary materials include single crystal materials such as Germanium, Gallium Arsenide, Indium Phosphide, etc. Typically, the slit material is cleaved along a crystallographic direction, rather than sawn, to minimize scattering across structural boundaries. In addition, the slit is oriented with respect to the incoming beam such that the interaction between the incoming radiation and the internal structure of the slit material produces a minimum amount of scattering. The crystals are attached to each slit holder made of high density material (e.g., tungsten) for complete blocking of the x-ray beam on one side of the slit. In some embodiments, each slit has a rectangular cross-section having a width of approximately 0.5 millimeters and a height of approximately 1-2 millimeters. As depicted in FIG. 2, the length, L, of a slit is approximately 6 millimeters.

In general, x-ray optics shape and direct x-ray radiation to specimen 101. In some examples, the x-ray optics include an x-ray monochromator to monochromatize the x-ray beam that is incident on the specimen 101. In some examples, the x-ray optics collimate or focus the x-ray beam onto measurement area 102 of specimen 101 to less than 1 milliradian divergence using multilayer x-ray optics. In these examples, the multilayer x-ray optics function as a beam monochromator, also. In some embodiments, the x-ray optics include one or more x-ray collimating mirrors, x-ray apertures, x-ray beam stops, refractive x-ray optics, diffractive optics such as zone plates, Montel optics, specular x-ray optics such as grazing incidence ellipsoidal mirrors, polycapillary optics such as hollow capillary x-ray waveguides, multilayer optics or systems, or any combination thereof. Further details are described in U.S. Patent Publication No. 2015/0110249, the content of which is incorporated herein by reference it its entirety.

X-ray detector 119 collects x-ray radiation 114 scattered from specimen 101 and generates output signals 135 indicative of properties of specimen 101 that are sensitive to the incident x-ray radiation in accordance with a T-SAXS measurement modality. In some embodiments, scattered x-rays 114 are collected by x-ray detector 119 while specimen positioning system 140 locates and orients specimen 101 to produce angularly resolved scattered x-rays.

In some embodiments, a T-SAXS system includes one or more photon counting detectors with high dynamic range (e.g., greater than $10^5$). In some embodiments, a single photon counting detector detects the position and number of detected photons.

In some embodiments, the x-ray detector resolves one or more x-ray photon energies and produces signals for each x-ray energy component indicative of properties of the specimen. In some embodiments, the x-ray detector 119 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 135 for further processing and storage.

Figure 4:
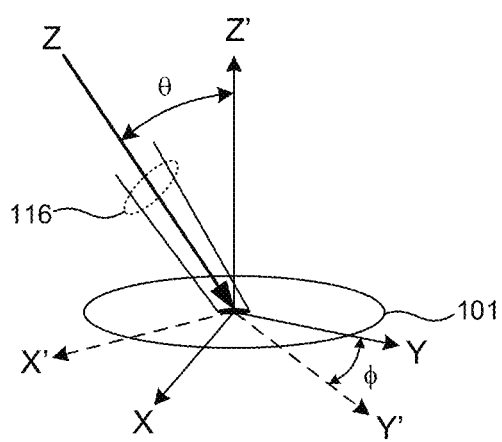
FIG. 4 depicts x-ray illumination beam 116 incident on wafer 101 at a particular orientation described by angles $\phi$ and $\theta$.

Each orientation of the illuminating x-ray beam 116 relative to the surface normal of a semiconductor wafer 101 is described by any two angular rotations of wafer 101 with respect to the x-ray illumination beam 115, or vice-versa. In one example, the orientation can be described with respect to a coordinate system fixed to the wafer. FIG. 4 depicts x-ray illumination beam 116 incident on wafer 101 at a particular orientation described by an angle of incidence, θ, and an azimuth angle, φ. Coordinate frame XYZ is fixed to the metrology system (e.g., illumination beam 116) and coordinate frame X'Y'Z' is fixed to wafer 101. The Y axis is aligned in plane with the surface of wafer 101. X and Z are not aligned with the surface of wafer 101. Z' is aligned with an axis normal to the surface of wafer 101, and X' and Y' are in a plane aligned with the surface of wafer 101. As depicted in FIG. 4, x-ray illumination beam 116 is aligned with the Z-axis and thus lies within the XZ plane. Angle of incidence, θ, describes the orientation of the x-ray illumination beam 116 with respect to the surface normal of the wafer in the XZ plane. Furthermore, azimuth angle, φ, describes the orientation of the XZ plane with respect to the X'Z' plane. Together, θ and φ, uniquely define the orientation of the x-ray illumination beam 116 with respect to the surface of wafer 101. In this example, the orientation of the x-ray illumination beam with respect to the surface of wafer 101 is described by a rotation about an axis normal to the surface of wafer 101 (i.e., Z' axis) and a rotation about an axis aligned with the surface of wafer 101 (i.e., Y axis). In some other examples, the orientation of the x-ray illumination beam with respect to the surface of wafer 101 is described by a rotation about a first axis aligned with the surface of wafer 101 and another axis aligned with the surface of wafer 101 and perpendicular to the first axis.

As illustrated in FIG. 1, metrology tool 100 includes a specimen positioning system 140 configured to both align specimen 101 and orient specimen 101 over a large range of angles of incidence and azimuth angle with respect to the illumination beam 116. In some embodiments, specimen positioning system 140 is configured to rotate specimen 101 over a large range of angles of rotation (e.g., at least 60 degrees) aligned in-plane with the surface of specimen 101. In this manner, angle resolved measurements of specimen 101 are collected by metrology system 100 over any number of locations and orientations on the surface of specimen 101. In one example, computing system 130 communicates command signals (not shown) to specimen positioning system 140 that indicate the desired position of specimen 101. In response, specimen positioning system 140 generates command signals to the various actuators of specimen positioning system 140 to achieve the desired positioning of specimen 101.

Figure 5:
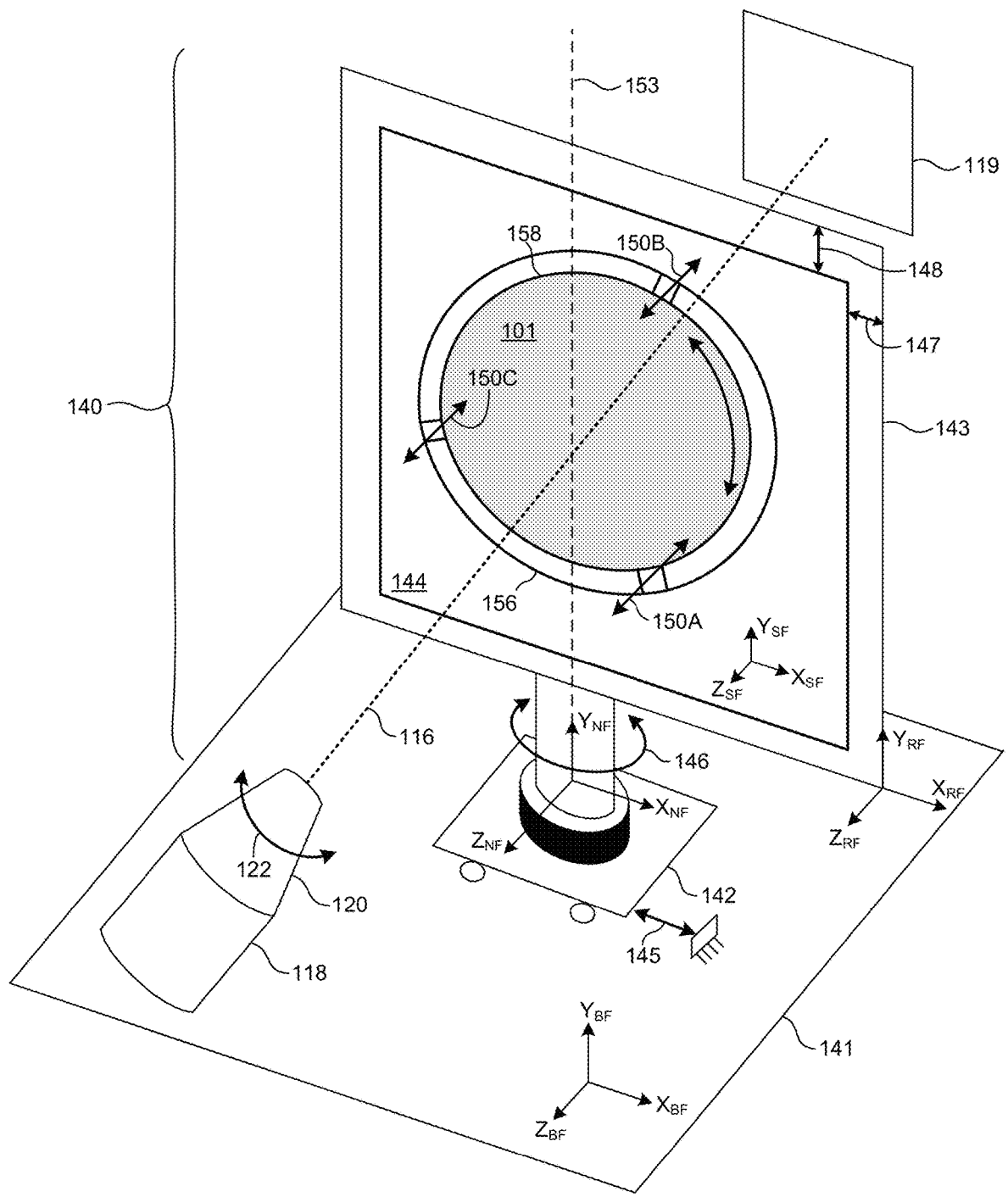
FIG. 5 is a diagram illustrative of a specimen positioning system 140 with the wafer stage moved to a position where the illumination beam 116 is incident on wafer 101.

FIG. 5 depicts a specimen positioning system 140 in one embodiment. As depicted in FIG. 5, specimen positioning system 140 includes a base frame 141, a lateral alignment stage 142, a stage reference frame 143, and a wafer stage 144. For reference purposes, the $\{X_{BF}, Y_{BF}, Z_{BF}\}$ coordinate frame is attached to base frame 141, the $\{X_{NF}, Y_{NF}, Z_{NF}\}$ coordinate frame is attached to lateral alignment stage 142, the $\{X_{RF}, Y_{RF}, Z_{RF}\}$ coordinate frame is attached to stage reference frame 143, and the $\{X_{SF}, Y_{SF}, Z_{SF}\}$ coordinate frame is attached to wafer stage 144. Wafer 101 is supported on wafer stage 144 by a tip-tilt-Z stage 156 including actuators 150A-C. A rotary stage 158 mounted to tip-tilt-Z stage 156 orients wafer 101 over a range of azimuth angles, ϕ, with respect to illumination beam 116. In the depicted embodiment, three linear actuators 150A-C are mounted to the wafer stage 144 and support rotary stage 158, which, in turn, supports wafer 101.

Actuator 145 translates the lateral alignment stage 142 with respect to the base frame 141 along the $X_{BF}$ axis. Rotary actuator 146 rotates the stage reference frame 143 with respect to lateral alignment stage 142 about an axis of rotation 153 aligned with the $Y_{NF}$ axis. Rotary actuator 146 orients wafer 101 over a range of angles of incidence, θ, with respect to illumination beam 116. Wafer stage actuators 147 and 148 translate the wafer stage 144 with respect to the stage reference frame 143 along the $X_{RF}$ and $Y_{RF}$ axes, respectively. Actuators 150A-C operate in coordination to translate the rotary stage 158 and wafer 101 with respect to the wafer stage 144 in the $Z_{SF}$ direction and tip and tilt rotary stage 158 and wafer 101 with respect to the wafer stage 144 about axes coplanar with the $X_{SF}$-$Y_{SF}$ plane. Rotary stage 158 rotates wafer 101 about an axis normal to the surface of wafer 101.

In summary, wafer stage 144 is capable of moving the wafer 101 with respect to the illumination beam 116 such that illumination beam 116 may be incident at any location on the surface of wafer 101 (i.e., at least 300 millimeter range in $X_{RF}$ and $Y_{RF}$ directions). Rotary actuator 146 is capable of rotating the stage reference frame 143 with respect to the illumination beam 116 such that illumination beam 116 may be incident at the surface of wafer 101 at any of a large range of angles of incidence (e.g., greater than two degrees). In one embodiment, rotary actuator 146 is configured to rotate stage reference frame 143 over a range of at least sixty degrees. Rotary actuator 158 mounted to wafer stage 144 is capable of rotating the wafer 101 with respect to the illumination beam 116 such that illumination beam 116 may be incident at the surface of wafer 101 at any of a large range of azimuth angles (e.g., at least ninety degrees rotational range).

In some other embodiments, lateral alignment stage 142 is removed and stage reference frame 143 is rotated with respect to base frame 141 by rotary actuator 146. In these embodiments, the x-ray illumination system includes one or more actuators that move one or more optical elements of the x-ray illumination system that cause the x-ray illumination beam 116 to move with respect to the base frame 141, for example, in the $X_{BF}$ direction. In these embodiments, movements of stage reference stage 143 are replaced by movements of one or more optical elements of the x-ray illumination system to move the x-ray illumination beam to the desired position with respect to the axis of rotation 153, for example.

In the depicted embodiments, beam shaping slit mechanism 120 is configured to rotate about the beam axis in coordination with the orientation of the specimen to optimize the profile of the incident beam for each angle of incidence, azimuth angle, or both. In this manner, the beam shape is matched to the shape of the metrology target. As depicted in FIG. 5, rotary actuator 122 rotates frame 120 and all attached mechanisms, actuators, sensors, and slits about the axis of illumination beam 116.

In a further aspect, a T-SAXS system is employed to determine properties of a specimen (e.g., structural parameter values) based on one or more diffraction orders of scattered light. As depicted in FIG. 1, system 100 includes a computing system 130 employed to acquire signals 135 generated by detector 119 and determine properties of the specimen based at least in part on the acquired signals and store the determined parameters of interest 139 in a memory (e.g., memory 190).

In some embodiments, metrology based on SAXS involves determining the dimensions of the sample by the inverse solution of a pre-determined measurement model with the measured data. The measurement model includes a few (on the order of ten) adjustable parameters and is representative of the geometry and optical properties of the specimen and the optical properties of the measurement system. The method of inverse solve includes, but is not limited to, model based regression, tomography, machine learning, or any combination thereof. In this manner, target profile parameters are estimated by solving for values of a parameterized measurement model that minimize errors between the measured scattered x-ray intensities and modeled results.

In some embodiments, the measurement model is an electromagnetic model (e.g., a Born Wave Model) of the measurement that generates images representative of the scattering from the target under measurement. For example, images 185 and 186 depicted in FIGS. 9B and 10B are images representative of scattering from a target under measurement. The modelled images may be parameterized by process control parameters (e.g., etch time, etch tilt, etch selectivity, deposition rate, focus, dosage, etc.). The modelled images may also be parameterized by structural parameters of the measured structure (e.g., height, diameter at different heights, alignment of a hole with respect to other structures, the straightness of a hole feature, the concentricity of a hole feature, thickness of deposited layers as a function of depth, uniformity of deposited layers across a particular hole feature or between different hole features, etc.).

The measured scattering images are employed to estimate values of one or more of the parameters of interest by performing an inverse solve. In some examples, an inverse solve estimates values of process parameters, geometric parameters, or both, that generate modelled scattering images that most closely match measured images. In some examples, the space of scattering images is searched using the measurement model by regression methods (e.g., gradient descent, etc.). In some examples, a library of precomputed images is generated and the library is searched to find values of one or more of the parameters of interest that result in the best match between modelled and measured images.

In some other examples, a measurement model is trained by a machine learning algorithm to relate many samples of scattering images and known process conditions, geometric parameter values, or both. In this manner, the trained measurement model maps measured scattering images to estimated values of process parameters, geometric parameters, or both. In some examples, the trained measurement model is a signal response metrology (SRM) model that defines a direct, functional relationship between actual measurements and parameters of interest.

In general, any of the trained models described herein is implemented as a neural network model. In other examples, any of the trained models may be implemented as a linear model, a non-linear model, a polynomial model, a response surface model, a support vector machines model, a decision tree model, a random forest model, a deep network model, a convolutional network model, or other types of models.

In some examples, any of the trained models described herein may be implemented as a combination of models. Additional description of model training and the use of trained measurement models for semiconductor measurements is provided in U.S. Patent Publication No. 2016/0109230 by Pandev et al., the content of which is incorporated herein by reference in its entirety.

In some other examples, a free-form model that does not include a preconceived geometry and material distribution describes the geometry and material parameters of the structure under measurement. In some examples, the model includes many small voxels (volumetric elements) that each have an independently adjustable material parameter value (e.g., electron density, absorptivity, or complex refractive index). In some other embodiments, the material properties are piecewise constant. The properties associated with each different material are determined a priori. The boundaries between different materials are free-form surfaces, and these surfaces can be determined by the level set algorithm.

The measured scatterometry data is used to calculate an image of the sample. In some examples, the image is a two dimensional (2-D) map of electron density, absorptivity, complex index of refraction, or a combination of these material characteristics. In some examples, the image is a three dimensional (3-D) map of electron density, absorptivity, complex index of refraction, or a combination of these material characteristics. The map is generated using relatively few physical constraints. These techniques are described in further detail in U.S. Patent Publication No. 2015/0300965 by Sezginer et al., the subject matter of which is incorporated herein by reference in its entirety.

In some embodiments, it is desirable to perform measurements at large ranges of angle of incidence and azimuth angle to increase the precision and accuracy of measured parameter values. This approach reduces correlations among parameters by extending the number and diversity of data sets available for analysis to include a variety of large-angle, out of plane orientations. For example, in a normal orientation, T-SAXS is able to resolve the critical dimension of a feature, but is largely insensitive to sidewall angle and height of a feature. However, by collecting measurement data over a broad range of out of plane angular orientations, the sidewall angle and height of a feature can be resolved. In other examples, measurements performed at large ranges of angle of incidence and azimuth angle provide sufficient resolution and depth of penetration to characterize high aspect ratio structures through their entire depth.

Measurements of the intensity of diffracted radiation as a function of x-ray incidence angle relative to the wafer surface normal are collected. Information contained in the multiple diffraction orders is typically unique between each model parameter under consideration. Thus, x-ray scattering yields estimation results for values of parameters of interest with small errors and reduced parameter correlation.

In one aspect, an X-Ray scatterometry measurement of one or more structures over a measurement area includes a decomposition of the one or more structures into a plurality of sub-structures, a decomposition of the measurement area into a plurality of sub-areas, or both. The measurement area is an area of a semiconductor wafer measured by a metrology system at a given instance or measurement interval (e.g., duration of data collection for an individual measurement). The decomposed structures, measurement areas, or both are independently simulated. For X-Ray scatterometry measurement applications accurately represented with the Born Approximation, sufficiently accurate metrology models are generated based on independent characterization of sub-structures, sub-areas, or both. Due to the weak scattering of X-Rays, SAXS measurements of semiconductor structures generally comply with the Born Approximation.

For X-Ray scatterometry measurements of periodic structures that are accurately represented with the Born Approximation, the field intensity for a given scattered order from an infinitesimal slice of the structure at a given height in the structure is linearly proportional to the Fourier coefficient of the periodic structure. The total field intensity requires integration of all of the intensities in the vertical direction. Since integration is linear operation, the fields from any layer are accumulated linearly. Similarly, for X-Ray scatterometry measurements of nearly periodic structures that are accurately represented with the Born Approximation, the field intensity for a given scattered order is linearly proportional to an approximation of the Fourier coefficient of the nearly periodic structure in the same fashion as the purely periodic structure. Thus, a linear relationship exists between scattering and a particular periodic, or nearly periodic, structure. For example, the scattering of two periodic structures stacked on top of one another is a linear combination of the scattering from each individual periodic structure.

Figure 6:
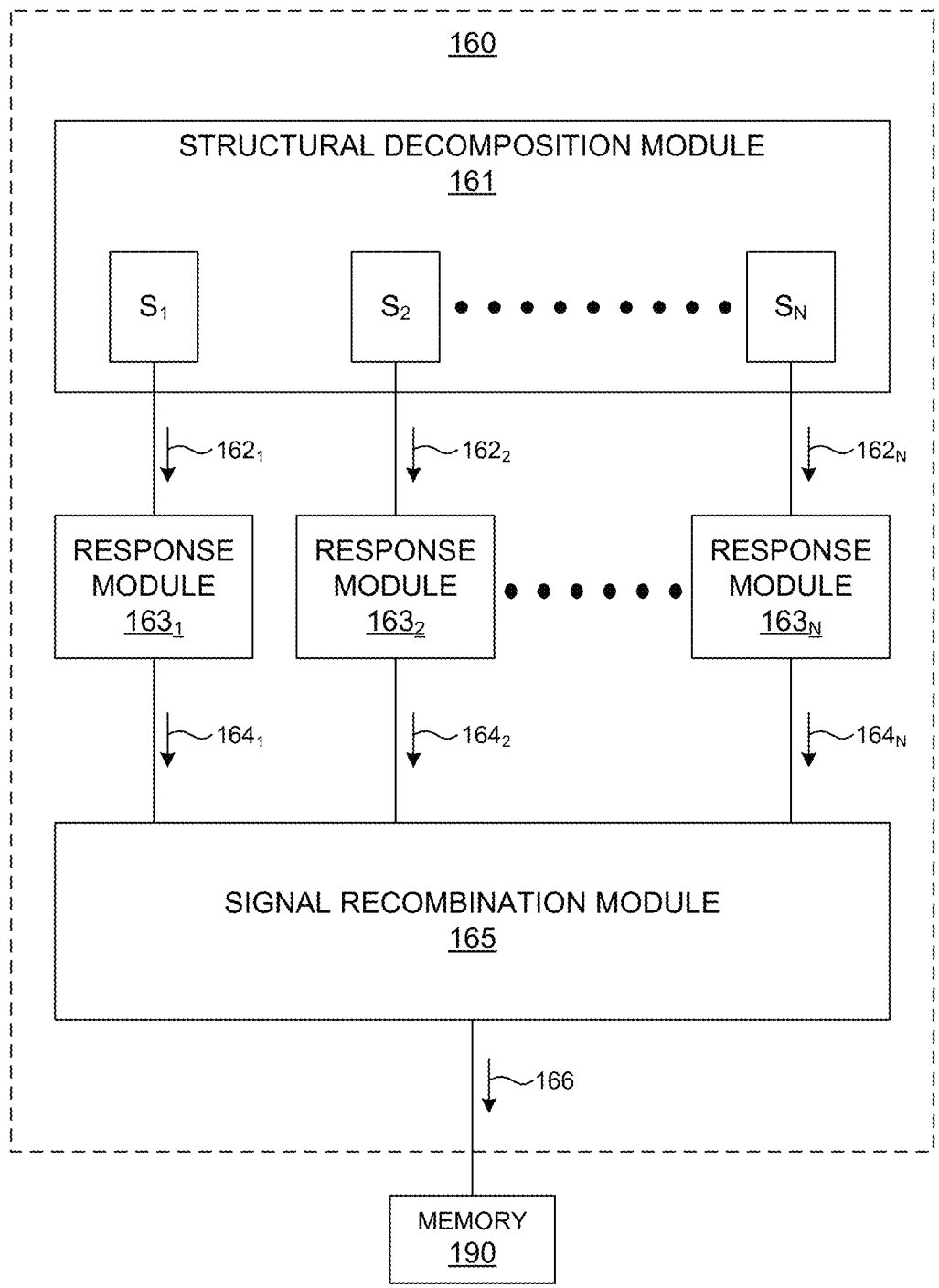
FIG. 6 is a diagram illustrative of an exemplary measurement decomposition engine 160 implemented by computing system 130.

FIG. 6 is a diagram illustrative of an exemplary measurement decomposition engine 160 implemented by computing system 130. As depicted in FIG. 6, measurement decomposition engine 160 includes a structural decomposition module 161 that generates a structural model associated with each of a number of decomposed measurement elements, $S_1, \ldots S_N$, where N is any suitable integer value. In some examples, a decomposed measurement element is a sub-structure of a structure under measurement. In some other examples, a decomposed measurement element includes any structure(s) or sub-structure(s) measured within a sub-area of the measurement area. In some embodiments, one or more of the structural models (i.e., $162_1 \ldots 162_N$) also includes material properties associated with the measured sub-structure(s), structure(s) or sub-structure(s) within the sub-area(s), or both. Each structural model $162_1 \ldots 162_N$ is communicated to a corresponding response module $163_1 \ldots 163_N$. Each response module $163_1 \ldots 163_N$ independently generates a scattering response $164_1 \ldots 164_N$ corresponding to each decomposed measurement element, $S_1, \ldots S_N$.

In some embodiments, a complicated periodic structure under measurement is modelled as a summation of simple, periodic sub-structures. In these embodiments, structural decomposition module 161 generates a structural model associated with each of the simple, periodic sub-structures. The scattering associated with each of these sub-structures is independently simulated. For complicated periodic geometric structures, various simple, periodic shapes are fit together to approximate the complicated structure. In this manner, the complicated structure is mathematically approximated by the summation of various simple, periodic shapes. In this manner, the modeled X-Ray scattering is essentially identical to the scattering of the complicated structure. In some examples, different periodic shapes of the same periodicity are employed to approximate the complicated structure. In some examples, different periodic shapes having different periodicities are employed to approximate the complicated structure. In some examples, a relatively simple shape repeated multiple times in a nearly periodic manner is employed to approximate the complicated structure.

In some examples, a complicated shape consumes very little of the total volume of a periodic model including a simple shape replicated periodically. In some of these examples, a complicated periodic structure is approximated as a simple structure with a small period and another structural perturbation with a large period that is an integer multiple of the small period. In this manner scattered orders of the small period and the large period that overlap (i.e., share the same scattering angle as measure in Q-space) are summed.

Figure 7:
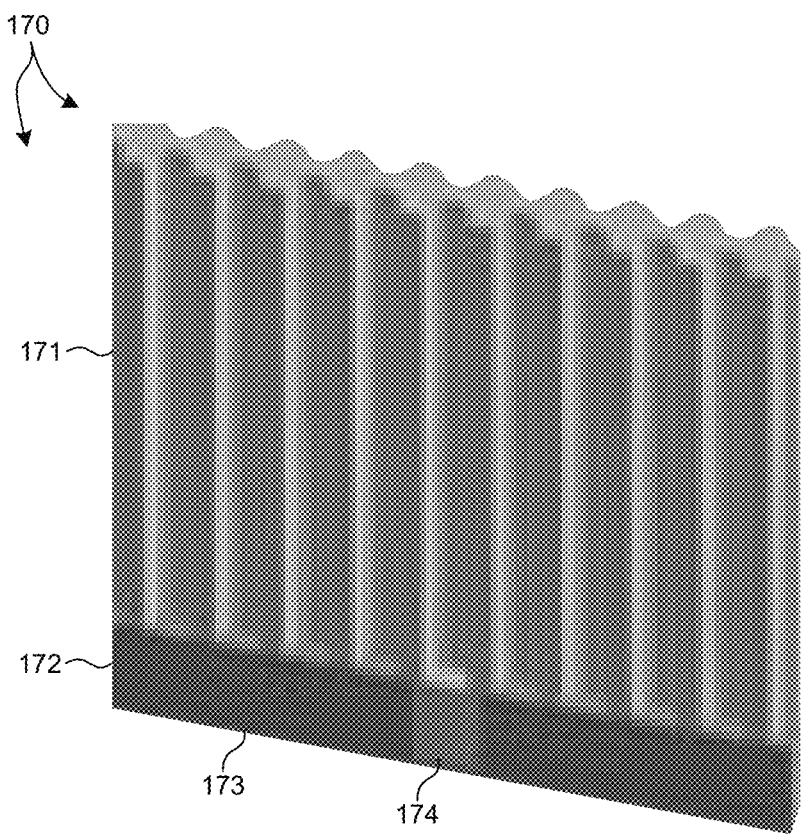
FIG. 7 depicts a unit cell 170 of a semiconductor structure under measurement.

FIG. 7 depicts a unit cell 170 of a semiconductor structure under measurement. Each unit cell 170 includes an array of contact structures 171 fabricated on a buried line structure 172. The buried line structure 172 includes a line of material 173 periodically interrupted by a block of different material 174. The spatial periodicity of the buried line structure 172 is significantly larger than the spatial periodicity of the contacts 171. In one example, every $10^{th}$ contact corresponds to a block of material 174. In this example, every $10^{th}$ scattered order of the array of contacts 171 overlaps with each scattered order of each block of different material (i.e., share the same scattering angle as measure in Q-space). In this example, the metrology structure is a repeating series of unit cells 170. In this example, only the unit cell 170 is modelled, not the entire metrology structure. Furthermore, the scattering associated with each different sub-structure (i.e., the array of contact structures 171 and the buried line structure 172) is summed in Q-space. In this manner, the scattering associated with each different sub-structure is simulated independently and summed to arrive at an estimate of the scattering of the metrology structure.

The measurement area may include multiple on-device structures or device-like scatterometry targets. In some embodiments, the measurement area is subdivided into a number of different sub-areas each associated with a different structure or combination of sub-structures. In these embodiments, structural decomposition module 161 generates a structural model associated with each of the sub-areas or each sub-structure of each sub-area. The scattering associated with each of these sub-areas is independently simulated.

Figures 8A, 8B:
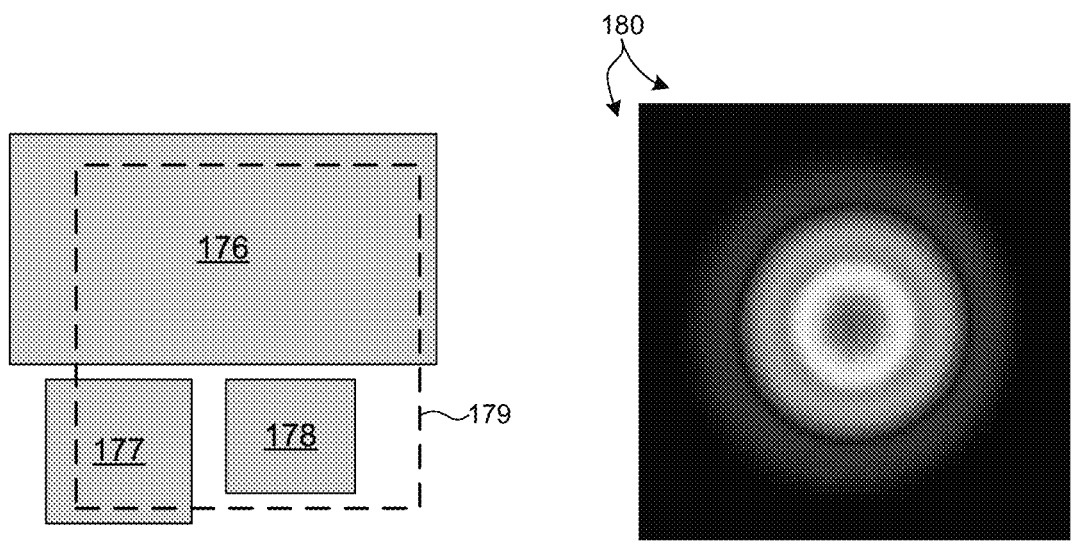
FIG. 8A depicts a measurement area 179 including multiple structures.
FIG. 8B depicts a plot 180 of a non-uniform distribution of illumination intensity over measurement area 179.

FIG. 8A depicts a measurement area 179 that includes structure 178 and portions of structures 176 and 177. In some examples, the illumination intensity is uniform across measurement area 179. In these examples, the intensity contribution from each area scales with the area of each sub-area. For example, the sub-area associated with the background of measurement area 179 is 20% of the measurement area, the sub-area associated with structure 176 is 60% of the measurement area 179, the sub-area associated with structure 177 is 10% of the measurement area 179, and the sub-area associated with structure 178 is 10% of the measurement area 179. However, in some other examples, the illumination intensity is not uniform across measurement area 179. For example, FIG. 8B depicts a plot 180 of a non-uniform distribution of illumination intensity over measurement area 179. In these examples, the intensity contribution from each area is computed by integrating the intensity distribution of each different sub-area of the measurement area to determine the intensity contribution from each area.

In another aspect, the scattering response associated with each decomposed measurement element is independently simulated. As depicted in FIG. 6, by way of non-limiting example, each response module $163_1 \ldots 163_N$ independently generates a scattering response $164_1 \ldots 164_N$ corresponding to each decomposed measurement element. In general, the complex scattered field associated with each decomposed structure is independently computed. In general, the Fourier transform of each decomposed measurement element is computed and used to simulate the scattered fields associated with each decomposed measurement element using any suitable electromagnetic modelling solver (e.g., Finite Element Method (FEM), Rigorous Coupled Wave Analysis (RCWA), Born Analysis, etc.). In a preferred embodiment, each resulting scattered field is propagated through a system model to arrive at an estimate of the scattered field associated with each decomposed measurement element at the detector. In some other embodiments, the scattered fields associated with each decomposed measurement element are combined at the target and the combined scattered field propagated through a system model to arrive at an estimate of the combined scattered field at the detector.

In yet another aspect, the scattering contributions of each of the independently simulated decomposed structures are combined to simulate the actual scattering of the measured structures within the measurement area. As depicted in FIG. 6, by way of non-limiting example, signal recombination module 165 estimates the modelled intensities 166 at the detector for the combination of scattering responses corresponding to each decomposed measurement element.

In general, the scattered fields associated with any combination of decomposed measurement structures are combined differently depending on whether the illumination of the underlying structure(s) is coherent, incoherent, or some combination of coherent and incoherent. In other words, when the paths of all interfering waves from the decomposed measurement structures differ by more than the coherence length of the illumination source, the illumination is perfectly incoherent. When the paths of all interfering waves from the decomposed measurement structures differ by less than the coherence length of the illumination source, the illumination is perfectly coherent. When the paths of some interfering waves from the decomposed measurement structures differ by less than the coherence length of the illumination source and some interfering waves from the decomposed measurement structures differ by more than the coherence length of the illumination source, the illumination is a combination of coherent and incoherent.

By way of example, the scattering amplitude of the scattered field associated with decomposed measurement structure $S_1$ is given by $A_1$. Similarly, the scattering amplitude of the scattered field associated with decomposed measurement structure $S_2$ is given by $A_2$.

If the illumination of decomposed measurement structures $S_1$ and $S_2$ is considered to be coherent, the combined intensity at the same point in q-Space is calculated as the sum of the scattering amplitudes multiplied by the complex conjugate of the sum of the scattering amplitudes as illustrated by equation (1).

$$I_{coherent} = \text{conj}(A_1+A_2)*(A_1+A_2) \quad (1)$$

If the illumination of decomposed measurement structures $S_1$ and $S_2$ is considered to be incoherent, the combined intensity at the same point in q-Space is calculated as the sum of each scattering amplitude multiplied by its complex conjugate as illustrated by equation (2), i.e., the sum of the intensities associated with the scattered fields of each decomposed measurement structure at the detector.

$$I_{incoherent} = \text{conj}(A_1)*A_1 + \text{conj}(A_2)*A_2 \quad (2)$$

For an idealized detector, illumination, and target, all photons arriving at each point on the detector correspond to a unique point in q-Space, that is, to a unique scattering angle from the target. However, in practice, various non-idealities, such as finite spot sizes on the target, non-zero divergence of the beam, non-periodicity in the target, etc., contribute to a finite point spread function at each scattering angle. Due to these non-idealities, it is common, for example, for a portion of the photons received at a point on the detector to come from two different orders. Because the light is scattered at two different points in q-Space, the intensities add incoherently.

If the illumination of decomposed measurement structures $S_1$ and $S_2$ is considered to be both incoherent and coherent, the combined intensity at the detector is calculated as a combination of the combined intensity as estimated by equation (1) and the combined intensity as measured by equation (2). For example, if the illumination of decomposed measurement structures $S_1$ and $S_2$ is considered to be half incoherent and half coherent, the combined intensity may be estimated as $(0.5*I_{coherent}+0.5*I_{incoherent})$. In this manner, the mixture of decomposed measurement structures $S_1$ and $S_2$ is considered as a linear combination of coherent and incoherent scatterers.

In general, the decomposition of one or more measured structures enables simplified simulations. Discretization, transform calculations, and electromagnetic simulations are independently performed on each decomposed structure with dramatically less computational effort than the same calculation performed on a complex model of the complete periodic unit cell.

In general, complicated combinations of on-device structures or device-like structures may be measured by decomposition. Direct modeling of such complicated combinations of structures would otherwise be prohibitively costly in time and computing resources.

However, the amount of collected signals for on-device measurements can be large. Thus, storing these signals and functions of these signals (e.g. Jacobians and Hessians) can cost significant resources. In a further aspect, principal component analysis or any other suitable data compression methodology (e.g., linear or nonlinear compression) is employed to reduce the dimension of the collected signals and associated transforms.

In a further aspect, measurement decomposition is employed as part of measurement model simulation, measurement model training, or measurement recipe development.

In some embodiments, a measured overlay metrology target includes two different structures in different sub-areas of the measurement area. In one example, half of the metrology target is a grating oriented in one direction (e.g., x-direction), while the other half of the metrology target is a grating oriented in an orthogonal direction (y-direction). In these embodiments, the overlay in the two directions (e.g., x and y directions) is measured simultaneously by measurement decomposition (i.e., linear combination of the measured signals from each grating structure).

In some embodiments, a measured overlay metrology target includes a combination of structures designed to measure overlay between more than two layers simultaneously. In these metrology targets different portions of the target indicate overlay between different layers (e.g., overlay between three back end of the line layers, M1, V0, M0).

SAXS systems often illuminate unintended regions of a device. For example, R-SAXS systems illuminate large areas and T-SAXS systems illuminate buried structures. Thus, it is common that incidental, non-essential data is measured on the detector.

Figure 9A:
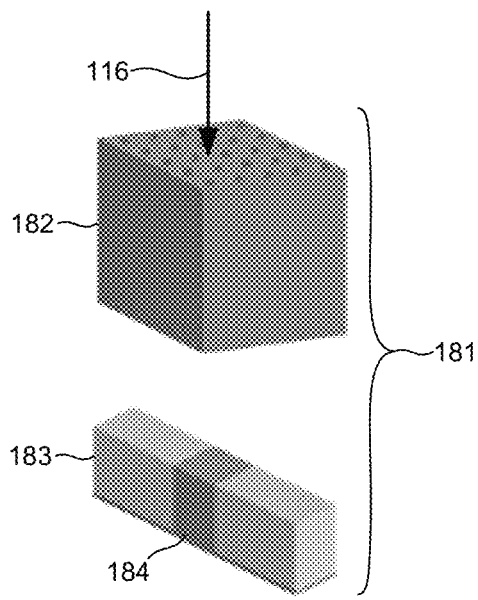
FIG. 9A depicts a measurement of a complex semiconductor structure 181 with normally incident illumination 116.
Figure 9B:
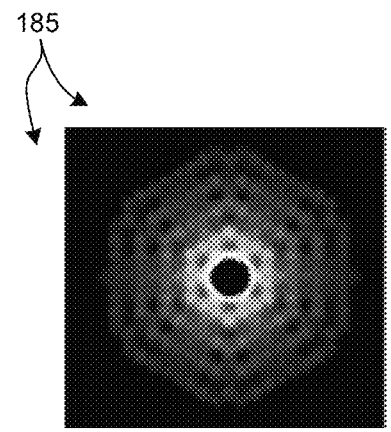
FIG. 9B depicts an image 185 of the scattered intensities associated with the measurement of complex semiconductor structure 181 with normal illumination.

FIG. 9A depicts the measurement of a complex semiconductor structure 181 with normally incident illumination 116. The complex semiconductor structure includes an array of holes 182 fabricated over a buried line structure 183 including a line of material periodically interrupted by a block of different material 184. FIG. 9B depicts an image 185 of the scattered intensities associated with a T-SAXS measurement of complex semiconductor structure 181 with normal illumination. As depicted in FIG. 9B, only scattering from the etched holes is observed.

Figure 10A:
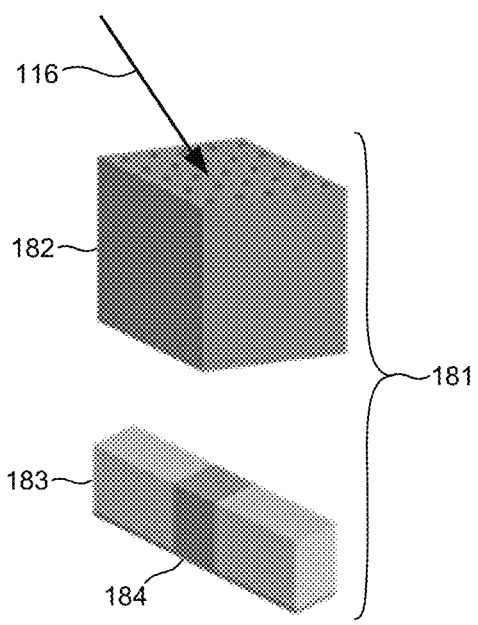
FIG. 10A depicts the measurement of the same complex semiconductor structure 181 with oblique incident illumination 116.
Figure 10B:
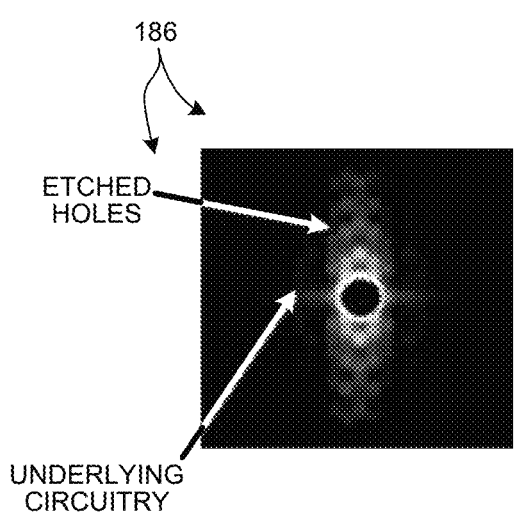
FIG. 10B depicts an image 186 of the scattered intensities associated with the measurement of complex semiconductor structure 181 with oblique illumination.

FIG. 10A depicts the measurement of the same complex semiconductor structure 181 with oblique incident illumination 116. FIG. 10B depicts an image 186 of the scattered intensities associated with the T-SAXS measurement of complex semiconductor structure 181 with oblique illumination. As depicted in FIG. 10B, scattering from both the etched holes and the buried line 183 are observed.

In a further aspect, measured intensities and modelled intensities including one or more incidental structures are employed to perform measurement of structures of interest. In some examples, on-device measurements are decomposed into a critical target for metrology and a complex under-layer structure that acts as an incidental structure. An incidental structure scatters illumination light that is detected at the detector, but an incidental structure is not of interest. Thus, scatterometry measurements of the critical structure are contaminated with measurement signals from the incidental structure.

In some examples, measurements are collected from a critical structure including contamination with measurement signals from an incidental structure. In addition, measurements are collected from a simple structure fabricated over the same incidental under-layer. Measurement decomposition as described herein is employed to directly subtract the measurement data associated with the critical structure from the measurement data associated with the simple structure to effectively cancel the measurement signals associated with the incidental under-layer.

In another further aspect, measurements of multiple structures, each having different combinations of decomposed sub-structures, are performed. In some embodiments, scattering from an incidental structure is modelled based on the measurements of the multiple structures. In some embodiments, scattering from an incidental structure is modelled based on measurements of the multiple structures where one of the structures does not include the incidental structure.

As illustrated in FIG. 10B, measurement of structure 181 with oblique illumination generates scattering from the last patterned structure (i.e., the array of holes 182) and an under-layer structure (i.e., buried line 183). However, in some embodiments, it is not necessary to build a detailed parametric model of the under-layer structure to measure the last patterned structure.

In another further aspect, a model of the SAXS measurement system includes an arbitrary incidental model (e.g., random model) of the underlayer structure and model decomposition is employed to decompose the measurement and isolate signals associated with the last patterned structure. Periodic structures scatter at specific angles in Q-space. However, random structures scatter at many different angles in Q-space. Thus, measurement decomposition is employed to separate scattering associated with one or more measured periodic structures and random scatterers (e.g., underlayer structures).

In some examples, the interaction of diffraction orders is decomposed based on a model of the structure of interest parameterized by one or more parameters of interest (e.g., critical dimensions, overlay, etc.) and the underlying incidental structure is modelled by an arbitrary parametric model (e.g., random model). The arbitrary parametric model is constrained by the model of the system.

In one example, the measurement model regresses the intended parameters of interest in the presence of the incidental structure (e.g., random underlying structure).

In another example, the measurement model regresses the random parametric model to identify the incidental data. The incidental data is subtracted from the measured data to recreate equivalent incidental free data from the combined, measured data. The measurement model then regresses the intended parameters of interest from the incidental free data.

In another further aspect, an incidental model operates directly on the measured, scattered data on the detector and effectively filters the measured data to remove the influence of incidental structures on the measured data. In some examples, the incidental model is a heuristic model employed to describe observed phenomena in the measured data that are known to be associated with incidental structures. The incidental model may be a linear model having constant coefficients operating on a set of basis functions. The coefficients are tuned to remove as much of the incidental data as possible from the measured data. After filtering the measured data, the resulting filtered measurement data is employed as part of a model based measurement of parameters of interest as described herein.

In some other examples, the observed scattering function is extracted through the model of the SAXS system by deconvolution, model fitting, training of a regression model (e.g., neural network model, etc.) to isolate measurement signals associated with the structure of interest. This approach is especially useful for measuring logic structures on-device. In these measurement applications, the structures often include periodic lines and spaces interrupted by aperiodic line cuts. X-ray scattering from the randomized cuts can be compensated by adjusting the model of the SAXS system, e.g., by flux re-normalization. For example, flux normalization mitigates decreased scattering due to random cuts which do not contribute to the primary diffraction peaks. In addition, the values of the parameters of interest for the periodic target, as well as the size of line cuts may be determined based on measurement decomposition as described hereinbefore.

In another further aspect, measurement decomposition is employed to train an input-output measurement model, such as a signal response metrology model (e.g., neural network model, deep learning network model, support vector machine model, etc.), that establishes a functional relationship between measured scattered intensities and values of one or more parameters of interest.

In some examples, measurement data is collected from relatively simple scatterometry structures and more complicated on-device or device like structures to train a library/model capable of estimating values of parameters of interest from measurements of the on-device or device-like structures. In some examples, the data collected from the relatively simple scatterometry targets is separated from data collected by regions of a larger structure by measurement decomposition. In some examples, a selectable illumination system (e.g., an acoustic optic modulator, digital mirror device, selectable apertures, etc., to control the illumination) allows separate illumination of the relatively simple scatterometry structures and the more complicated on-device or device like structures by varying the size of the measurement area (e.g., from 5 micrometers to over 1 millimeter).

The relatively simple scatterometry targets could be one or more easily characterized regions of a larger structure or physically separated structures. By measurement decomposition, selectable illumination, or both, uncorrupted measurement data enables accurate measurement model training. The trained measurement model enables faster measurements of complex structures based on measurements corrupted by incidental data. In some examples, a measurement model is trained on dense target results with matching in-cell measurements to filter the effect of incidental gratings.

For systems limited by light, where larger illuminated areas mean faster measurement (e.g. SAXS), this also means that recipes can be created on measurements from simple targets (e.g., from decoupled signals) and trained to report these measurements on complex on-device measurements.

In another further aspect, measurement decomposition is employed to optimize a measurement recipe for a particular measurement application. An optimized measurement recipe includes a selection of physical parameters of the measurement system that enhances signals of interest and suppresses signals from incidental structures.

As depicted in FIGS. 9A-9B and FIGS. 10A-10B, the observability of scattering from the underlying structure at the detector depends on the selection of illumination incidence angle. In measurement applications focused on the last patterned structures, the proper selection of illumination incidence angle enables suppression of incidental scattering signals arising from the underlying structure. In general, system modeling based on measurement decomposition enables simulation of various measurement recipes (i.e., combinations of measurement system parameter values) that enhance signals of interest and suppress signals from incidental structures. Exemplary system parameters include, but are not limited to, divergence shape, illumination spot shape, illumination spot location, angle of incidence, azimuth angle, exposure time, target orientation, and source shape. By using the sampling strategies for decomposed measurements as described herein, the degree of signal contamination can be quantified either by raw signal residuals or metrology results via simulation of decomposed models. In addition, these results may be verified by actual measurements when feasible targets exist.

In another aspect, process corrections are determined based on the measured values of the parameters of interest (e.g., critical dimension, overlay, height, sidewall angle, etc.) and the corrections are communicated to a process tool to change one or more process control parameters of the process tool (e.g., lithography tool, etch tool, deposition tool, etc.). In some embodiments, SAXS measurements are performed and process control parameters are updated while the process is being executed on the measured structure. In some embodiments, SAXS measurements are performed after a particular process step and process control parameters associated with that process step are updated for processing of future devices by that process step. In some embodiments, SAXS measurements are performed after a particular process step and process control parameters associated with a subsequent process step are updated for processing of the measured device or other devices by the subsequent process step.

In some examples, values of measured parameters determined based on measurement methods described herein can be communicated to an etch tool to adjust the etch time to achieve a desired etch depth. In a similar way etch parameters (e.g., etch time, diffusivity, etc.) or deposition parameters (e.g., time, concentration, etc.) may be included in a measurement model to provide active feedback to etch tools or deposition tools, respectively. In some examples, corrections to process parameters determined based on measured device parameter values may be communicated to the process tool. In one embodiment, computing system 130 determines values of one or more parameters of interest during process based on measured signals 135 received from metrology system 100. In addition, computing system 130 communicates control commands 138 to a process tool (e.g., etch tool, ion implant tool, lithography tool, etc.) based on the determined values of the one or more parameters of interest. The control commands 138 cause a process controller to change the state of the process (e.g., stop the etch process, change the diffusivity, change lithography focus, change lithography dosage, etc.). In one example, control command 138 causes a process controller to stop the etch process when a desired etch depth is measured. In another example, control command 138 causes a process controller to change etch rate to improve measured wafer uniformity of a CD parameter.

In general, as incident x-ray illumination interacts with periodic features, the x-ray illumination scatters coherently, partially coherently, or incoherently to create a diffraction image on detector 119 (e.g., images 185 and 186 depicted in FIGS. 9B and 10B). The desired scattered image or sequence of scattered images is achieved when the process tool is properly tuned. However, as the measured images deviate from the desired image or sequence of desired images, these deviations indicate process tool drift and also the corrections to process control variables required to bring the process tool back into proper tune.

In general, a metrology target is characterized by an aspect ratio defined as a maximum height dimension (i.e., dimension normal to the wafer surface) divided by a maximum lateral extent dimension (i.e., dimension aligned with the wafer surface) of the metrology target. In some embodiments, the metrology target under measurement has an aspect ratio of at least twenty. In some embodiments, the metrology target has an aspect ratio of at least forty.

Figure 11A:
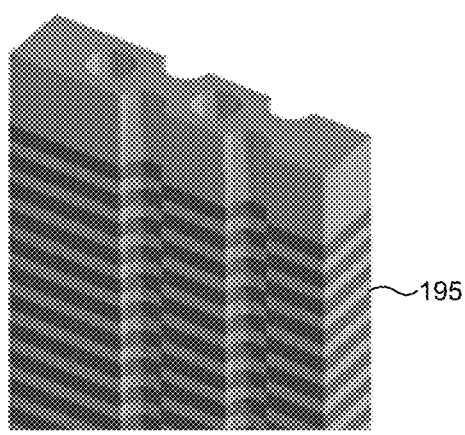
FIGS. 11A-11C depict an isometric view, a top view, and a cross-sectional view, respectively, of a typical 3D FLASH memory device subject to measurement as described herein.
Figure 11B:
Figure 11C:

FIGS. 11A-11C depict an isometric view, a top view, and a cross-sectional view, respectively, of a typical 3D FLASH memory device 195 subject to measurement in the manner described herein. The total height (or equivalently depth) of memory device 195 ranges from one to several micrometers. Memory device 195 is a vertically manufactured device. A vertically manufactured device, such as memory device 195, essentially turns a conventional, planar memory device 90 degrees, orienting the bit line and cell string vertically (perpendicular to wafer surface). To provide sufficient memory capacity, a large number of alternating layers of different materials are deposited on the wafer. This requires patterning processes to perform well to depths of several microns for structures with a maximum lateral extent of one hundred nanometers or less. As a result, aspect ratios of 25 to 1 or 50 to 1 are not uncommon.

Although, FIG. 1 depicts a transmission SAXS measurement system, in general, a reflective SAXS (R-SAXS) measurement system may be employed to measure shallow features in the manner described herein.

Figure 12:
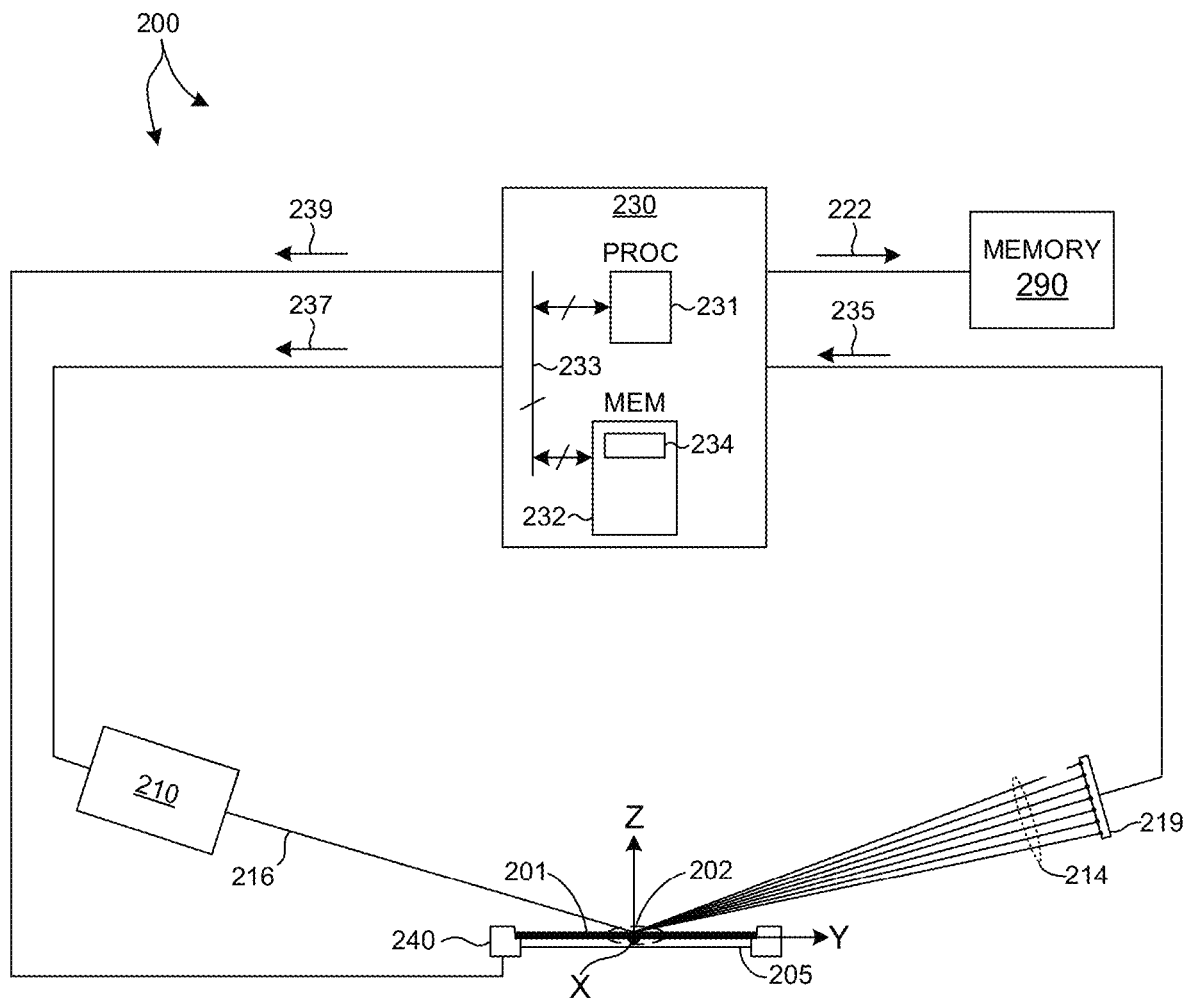
FIG. 12 depicts another exemplary metrology system 200 configured to perform measurement decomposition in accordance with the methods described herein.

FIG. 12 depicts an exemplary R-SAXS metrology system 200 for measuring a wafer 201 based on x-ray scatterometry measurements of semiconductor structures disposed on the wafer. R-SAXS metrology system 200 includes a reflective x-ray scatterometer. Wafer 201 is attached to wafer chuck 205 and is positioned with respect to the x-ray scatterometer by wafer stage 240.

In the depicted embodiment, the R-SAXS metrology system 200 includes an x-ray illumination source 210 configured to generate x-ray radiation suitable for reflective SAXS measurements analogous to the description of illumination source 110 with reference to FIG. 1.

In some examples, computing system 130 communicates command signals 237 to x-ray illumination source 210 that cause x-ray illumination source 210 to emit x-ray radiation at a desired energy level. The energy level is changed to acquire measurement data with more information about the high aspect ratio structures under measurement.

The illumination beam 216 illuminates specimen 201 over a measurement spot 202. After incidence with wafer 201, scattered x-ray radiation 214 is collected by X-ray detector 219 and generates output signals 235 indicative of properties of specimen 201 that are sensitive to the incident x-ray radiation in accordance with a reflective SAXS measurement modality. In some embodiments, scattered x-rays 214 are collected by x-ray detector 219 while specimen positioning system 240 locates and orients specimen 201 to produce angularly resolved scattered x-rays in accordance with command signals 239 communicated from computing system 230 to specimen positioning system 240.

Figure 13:
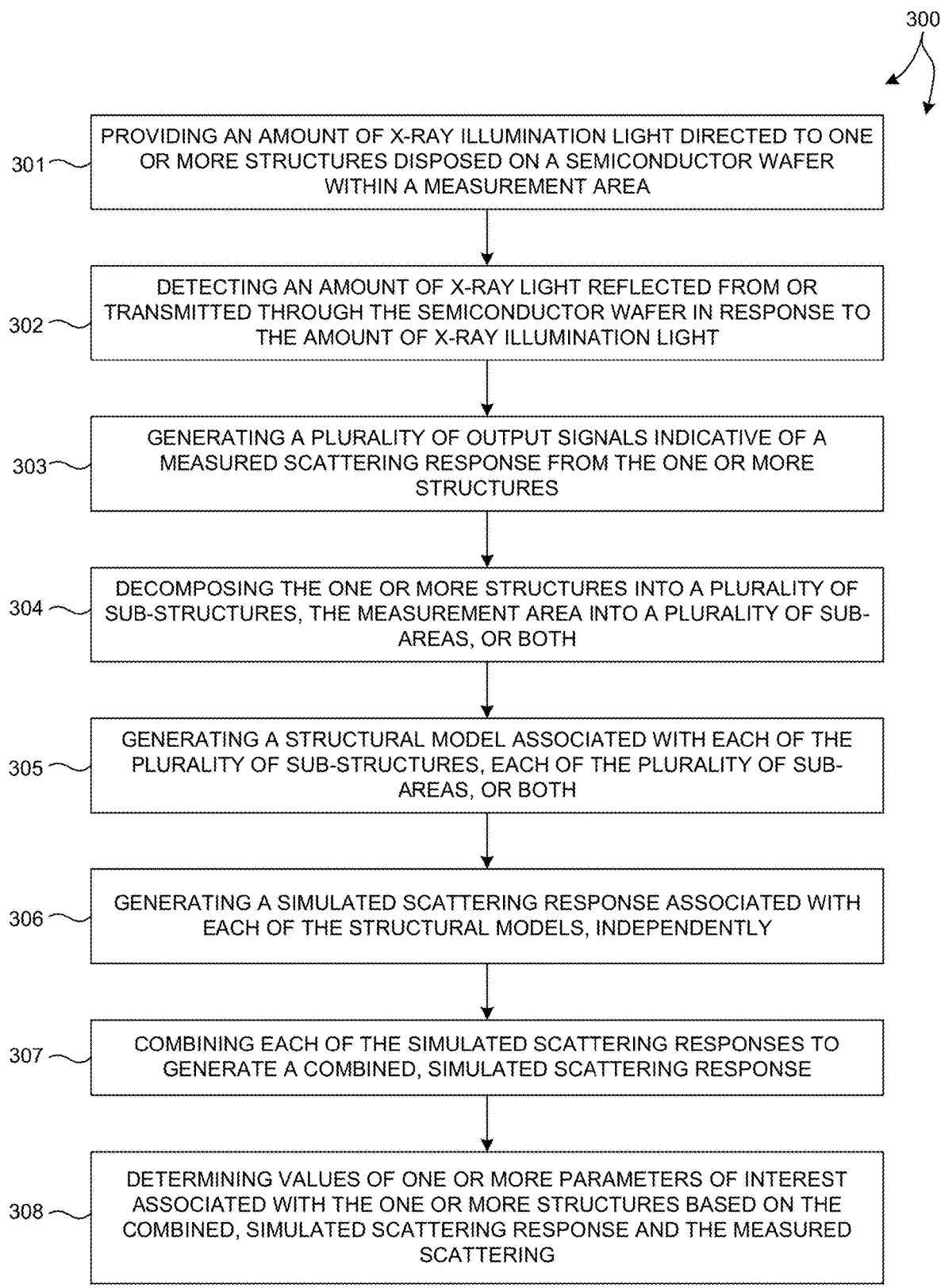
FIG. 13 depicts a flowchart illustrative of an exemplary method 300 of performing model based X-Ray scatterometry measurements as described herein.

In a further aspect, computing system 230 is employed to determine properties of wafer 201 (e.g., structural parameter values) based on one or more diffraction orders of scattered light. As depicted in FIG. 13, system 200 includes a computing system 230 employed to acquire signals 235 generated by detector 219 and determine properties of the specimen based at least in part on the acquired signals, and store an indication 222 of the determined values of the parameters of interest in a memory (e.g., memory 290).

In general, computing system 130 is configured to access model parameters in real-time, employing Real Time Critical Dimensioning (RTCD), or it may access libraries of pre-computed models for determining a value of at least one specimen parameter value associated with the specimen 101. In general, some form of CD-engine may be used to evaluate the difference between assigned CD parameters of a specimen and CD parameters associated with the measured specimen. Exemplary methods and systems for computing specimen parameter values are described in U.S. Pat. No. 7,826,071, issued on Nov. 2, 2010, to KLA-Tencor Corp., the entirety of which is incorporated herein by reference.

In another aspect, one or more SAXS systems are configured to measure multiple, different areas of a wafer during a process interval. In some embodiments, a wafer uniformity value associated with each measured parameter of interest is determined based on measured values of each parameter of interest across the wafer.

In some embodiments, multiple metrology systems are integrated with the process tool and the metrology systems are configured to simultaneously measure different areas across the wafer during process. In some embodiments, a single metrology system integrated with a process tool is configured to sequentially measure multiple, different areas of a wafer during process.

In some embodiments, the methods and systems for SAXS based metrology of semiconductor devices as described herein are applied to the measurement of memory structures. These embodiments enable critical dimension (CD), film, and composition metrology for periodic and planar structures.

Scatterometry measurements as described herein may be used to determine characteristics of a variety of semiconductor structures. Exemplary structures include, but are not limited to, FinFETs, low-dimensional structures such as nanowires or graphene, sub 10 nm structures, lithographic structures, through substrate vias (TSVs), memory structures such as DRAM, DRAM 4F2, FLASH, MRAM and high aspect ratio memory structures. Exemplary structural characteristics include, but are not limited to, geometric parameters such as line edge roughness, line width roughness, pore size, pore density, side wall angle, profile, critical dimension, pitch, thickness, overlay, and material parameters such as electron density, composition, grain structure, morphology, stress, strain, and elemental identification. In some embodiments, the metrology target is a periodic structure. In some other embodiments, the metrology target is aperiodic.

In some examples, measurements of critical dimensions, thicknesses, overlay, and material properties of high aspect ratio semiconductor structures including, but not limited to, spin transfer torque random access memory (STT-RAM), three dimensional NAND memory (3D-NAND) or vertical NAND memory (V-NAND), dynamic random access memory (DRAM), three dimensional FLASH memory (3D-FLASH), resistive random access memory (Re-RAM), and phase change random access memory (PC-RAM) are performed with T-SAXS measurement systems as described herein.

In some examples, the measurement models are implemented as an element of a SpectraShape® critical-dimension metrology system available from KLA-Tencor Corporation, Milpitas, Calif., USA. In this manner, the model is created and ready for use immediately after the scattering images are collected by the system.

In some other examples, the measurement models are implemented off-line, for example, by a computing system implementing AcuShape® software available from KLA-Tencor Corporation, Milpitas, Calif., USA. The resulting models may be incorporated as an element of an AcuShape® library that is accessible by a metrology system performing measurements.

FIG. 13 illustrates a method 300 of performing metrology measurements in at least one novel aspect. Method 300 is suitable for implementation by a metrology system such as the SAXS metrology systems illustrated in FIGS. 1 and 12 of the present invention. In one aspect, it is recognized that data processing blocks of method 300 may be carried out via a pre-programmed algorithm executed by one or more processors of computing system 130, computing system 230, or any other general purpose computing system. It is recognized herein that the particular structural aspects of the metrology systems depicted in FIGS. 1 and 12 do not represent limitations and should be interpreted as illustrative only.

In block 301, an amount of x-ray illumination light is provided to one or more structures disposed on a semiconductor wafer within a measurement area.

In block 302, an amount of x-ray light reflected from or transmitted through the semiconductor wafer is detected in response to the amount of x-ray illumination light.

In block 303, a plurality of output signals are generated. The output signals are indicative of a measured scattering response from the one or more structures.

In block 304, the one or more structures are decomposed into a plurality of sub-structures, the measurement area into a plurality of sub-areas, or both.

In block 305, a structural model associated with each of the plurality of sub-structures, each of the plurality of sub-areas, or both, is generated.

In block 306, a simulated scattering response associated with each of the structural models is independently generated.

In block 307, the simulated scattering responses are combined to generate a combined, simulated scattering response.

In block 308, values of one or more parameters of interest associated with the one or more structures are determined based on the combined, simulated scattering response and the measured scattering response.

In a further embodiment, system 100 includes one or more computing systems 130 employed to perform measurements of semiconductor structures based on scatterometry measurement data collected in accordance with the methods described herein. The one or more computing systems 130 may be communicatively coupled to one or more detectors, active optical elements, process controllers, etc. In one aspect, the one or more computing systems 130 are configured to receive measurement data associated with scatterometry measurements of structures of wafer 101.

It should be recognized that one or more steps described throughout the present disclosure may be carried out by a single computer system 130 or, alternatively, a multiple computer system 130. Moreover, different subsystems of system 100 may include a computer system suitable for carrying out at least a portion of the steps described herein. Therefore, the aforementioned description should not be interpreted as a limitation on the present invention but merely an illustration.

In addition, the computer system 130 may be communicatively coupled to the spectrometers in any manner known in the art. For example, the one or more computing systems 130 may be coupled to computing systems associated with the scatterometers. In another example, the scatterometers may be controlled directly by a single computer system coupled to computer system 130.

The computer system 130 of system 100 may be configured to receive and/or acquire data or information from the subsystems of the system (e.g., scatterometers and the like) by a transmission medium that may include wireline and/or wireless portions. In this manner, the transmission medium may serve as a data link between the computer system 130 and other subsystems of system 100.

Computer system 130 of system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board system 100, external memory, or other external systems). For example, the computing system 130 may be configured to receive measurement data from a storage medium (i.e., memory 132 or an external memory) via a data link. For instance, scattered images obtained using the scatterometers described herein may be stored in a permanent or semi-permanent memory device (e.g., memory 132 or an external memory). In this regard, the scatterometry images may be imported from on-board memory or from an external memory system. Moreover, the computer system 130 may send data to other systems via a transmission medium. For instance, a measurement model or an estimated parameter value determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape. Computing system 230, including elements 231-234, is analogous to computing system 130, including elements 131-134, respectively, as described herein.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology system may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An x-ray scatterometry based metrology system comprising:
   an x-ray illumination source configured to provide an amount of x-ray illumination light directed to one or more structures disposed on a semiconductor wafer within a measurement area;
   a detector configured to detect an amount of x-ray light reflected from or transmitted through the semiconductor wafer in response to the amount of x-ray illumination light and generate a plurality of output signals indicative of a measured scattering response from the one or more structures; and
   a computing system configured to:
   decompose the one or more structures into a plurality of sub-structures, the measurement area into a plurality of sub-areas, or both;
   generate a structural model associated with each of the plurality of sub-structures, each of the plurality of sub-areas, or both;
   generate a simulated scattering response associated with each of the structural models, independently;
   combine each of the simulated scattering responses to generate a combined, simulated scattering response; and
   determine values of one or more parameters of interest associated with the one or more structures based on the combined, simulated scattering response and the measured scattering response.

2. The x-ray scatterometry based metrology system of claim 1, wherein the plurality of sub-structures includes different periodic shapes of the same periodicity.

3. The x-ray scatterometry based metrology system of claim 1, wherein the plurality of sub-structures includes different periodic shapes having different periodicities.

4. The x-ray scatterometry based metrology system of claim 1, wherein the plurality of sub-structures includes a shape repeated multiple times in a nearly periodic manner.

5. The x-ray scatterometry based metrology system of claim 1, wherein the plurality of sub-structures includes a first structure having a relatively small period and a second structure having a relatively large period that is an integer multiple of the small period.

6. The x-ray scatterometry based metrology system of claim 1, wherein each of the plurality of sub-areas is associated with a single structure or a decomposition of the single structure into a plurality of sub-structures.

7. The x-ray scatterometry based metrology system of claim 1, wherein a contribution of each of the plurality of sub-areas to intensities of the combined, simulated scattering response at the detector scales in proportion to an area of each sub-area.

8. The x-ray scatterometry based metrology system of claim 1, wherein the generating of the simulated scattering response associated with each of the structural models involves a computation of a scattered field associated with each structural model using an electromagnetic modelling solver.

9. The x-ray scatterometry based metrology system of claim 8, wherein the generating of the simulated scattering response associated with each of the structural models involves propagating the scattered field through a system model to arrive at the simulated scattering responses associated with each structural model at the detector.

10. The x-ray scatterometry based metrology system of claim 1, wherein the generation of the combined, simulated scattering response involves combining each of the simulated scattering responses coherently, incoherently, or a combination thereof.

11. The x-ray scatterometry based metrology system of claim 1, wherein the computing system is further configured to:
    communicate an indication of the values of the one or more parameters of interest to a fabrication tool that causes the fabrication tool to adjust a value of one or more process control parameters of the fabrication tool.

12. The x-ray scatterometry based metrology system of claim 1, wherein the amount of x-ray illumination light is directed to the measurement spot at a plurality of angles of incidence, azimuth angles, or both.

13. The x-ray scatterometry based metrology system of claim 1, wherein the x-ray illumination source is further configured to provide the amount of x-ray illumination light directed to a measurement spot at a plurality of different energy levels.

14. The x-ray scatterometry based metrology system of claim 1, wherein the determining the values of the one or more parameters of interest is based on a model-based measurement model, a trained signal response metrology (SRM) measurement model, or a tomographic measurement model.

15. The x-ray scatterometry based metrology system of claim 1, wherein the one or more structures includes a three-dimensional NAND structure or a dynamic random access memory (DRAM) structure.

16. The x-ray scatterometry based metrology system of claim 1, wherein the one or more structures includes at least one structure of interest and at least one incidental structure, and wherein the combined, simulated scattering response includes modelled contributions from the at least one structure of interest and the at least one incidental structure.

17. The x-ray scatterometry based metrology system of claim 1, wherein the one or more structures includes at least one structure of interest and at least one incidental structure, the computing system further configured to:
    filter the measured scattering response to reduce a contribution from the at least one incidental structure, wherein the determining of the values of the one or more parameters of interest associated with the at least one structure of interest is based on the filtered, measured scattering response.

18. An x-ray scatterometry based metrology system comprising:
    an x-ray illumination source configured to provide an amount of x-ray illumination light directed to one or more structures disposed on a semiconductor wafer within a measurement area;

a detector configured to detect an amount of x-ray light reflected from or transmitted through the semiconductor wafer in response to the amount of x-ray illumination light and generate a plurality of output signals indicative of a measured scattering response from the one or more structures; and a non-transitory, computer readable medium comprising instructions that when executed by one or more processors cause the one or more processors to:

decompose the one or more structures into a plurality of sub-structures, the measurement area into a plurality of sub-areas, or both;

generate a structural model associated with each of the plurality of sub-structures, each of the plurality of sub-areas, or both;

generate a simulated scattering response associated with each of the structural models, independently;

combine each of the simulated scattering responses to generate a combined, simulated scattering response; and determine values of one or more parameters of interest associated with the one or more structures based on the combined, simulated scattering response and the measured scattering response.

19. A method comprising:

providing an amount of x-ray illumination light directed to one or more structures disposed on a semiconductor wafer within a measurement area;

detecting an amount of x-ray light reflected from or transmitted through the semiconductor wafer in response to the amount of x-ray illumination light;

generating a plurality of output signals indicative of a measured scattering response from the one or more structures;

decomposing the one or more structures into a plurality of sub-structures, the measurement area into a plurality of sub-areas, or both;

generating a structural model associated with each of the plurality of sub-structures, each of the plurality of sub-areas, or both;

generating a simulated scattering response associated with each of the structural models, independently;

combining each of the simulated scattering responses to generate a combined, simulated scattering response; and determining values of one or more parameters of interest associated with the one or more structures based on the combined, simulated scattering response and the measured scattering response.

20. The method of claim 19, further comprising:

communicating an indication of the values of the one or more parameters of interest to a fabrication tool that causes the fabrication tool to adjust a value of one or more process control parameters of the fabrication tool.

* * * * *